March 15, 1960 R. E. ASHWILL ET AL 2,928,793
MOVING-BED VAPOR-PHASE TREATMENT OF KAOLIN CLAYS
Filed April 19, 1956 3 Sheets-Sheet 3

INVENTORS.
*Richard E. Ashwill*
*& Numer M. Kapp*
BY
William Klabunde
ATTORNEY.

United States Patent Office 2,928,793
Patented Mar. 15, 1960

2,928,793

MOVING-BED VAPOR-PHASE TREATMENT OF KAOLIN CLAYS

Richard E. Ashwill, Claymont, Del., and Numer M. Kapp, Swarthmore, Pa., assignors to Houdry Process Corporation, Wilmington, Del., a corporation of Delaware Application April 19, 1956, Serial No. 579,371

9 Claims. (Cl. 252—450)

This invention relates to the treatment of discrete particles of kaolin clay, such as the clay pellets commonly employed as the catalytic material in the catalytic cracking or other conversion of hydrocarbons. More particularly, the invention relates to the sulfation and/or desulfation treatment of kaolin clay catalyst for the purpose of activating or otherwise improving the characteristics of the same. In methods heretofore employed in the sulfation-desulfation treatment of clays it has been a practice to effect the sulfation treatment by contacting the raw clay with concentrated liquid sulfuric acid, followed by a denning or aging treatment at elevated temperature and by water washing to remove the soluble sulfates. Desulfation treatment was thereafter effected by passing the sulfated clay through a rotary kiln under high-temperature conditions sufficient to thermally decompose the sulfates.

In accordance with the present invention, either or both of the sulfation and desulfation treatments are carried out in a moving-bed process, that is, with the clay particles gravitating as a compact moving mass through the treating zone, and in a vapor-phase operation with countercurrent flow of gaseous treating material through the moving bed.

In a preferred method of carrying out the invention, sulfation is effected by passing the clay particles as a compact moving mass sequentially through a series of treating zones wherein, as separate treatments, the clay is preheated by contact with an inert gas to a temperature sufficient to initiate the sulfation reactions, and is thereafter contacted with vaporous sulfur trioxide in a single zone, or in plural stages with intermediate cooling. In single zone treatment, the need for cooling may be overcome by maintaining a low $SO_3$ concentration and providing a relatively long contact time. Where cooling is provided by means of conventional cooling coils, provision is made for sealing the cooling zone to prevent condensation of the sulfating gas on the cooling coils. Subsequent desulfation of the sulfated material is effected by passing the same as a compact moving mass through a reduction zone wherein the sulfated clay is contacted with reducing gas to decompose the sulfates. Steam treatment of the clay for selectivity adjustment is added either as part of the desulfation treatment or as a separate treatment. The sulfation, desulfation and steam treatments may be carried out in separate units as stated above, or the entire operation may be carried out in a single unit, preferably the latter. In any case, conventional means, such as seal legs, are provided for the purpose of maintaining the desired operating pressures within the treating zones and for preventing the escape of gaseous material with the stream of solids leaving the treating zones.

In such preferred mode of operation, pellets or granules of kaolin clay are preheated with flue gas to a temperature of approximately 700° F. and are then subjected to a first-stage treatment with vaporous sulfur trioxide to effect the desired sulfation treatment of the pellets. The supply of $SO_3$ to the initial sulfation zone is controlled to prevent an excessive temperature rise due to the exothermic sulfation reaction. After a suitable cooling treatment in a separate zone to lower the temperature of the pellets to approximately 700° F., the pellets are subjected to a second stage of treatment in the presence of $SO_3$ in another sulfation zone wherein the sulfation reaction is carried to desired completion. Following the complete sulfation treatment the pellets are subjected to desulfation, in either the same unit or in a separate treating unit, as stated. In the reduction zone the pellets are subjected to treatment in the presence of reducing gas, such as a hydrogen, nitrogen and steam mixture, and at a temperature in excess of 1,000° F. to effect the desired desulfation.

For a clearer understanding of the invention reference may be had to the following specification and claims taken in connection with the accompanying drawings forming a part of this application, in which:

Figure 1:
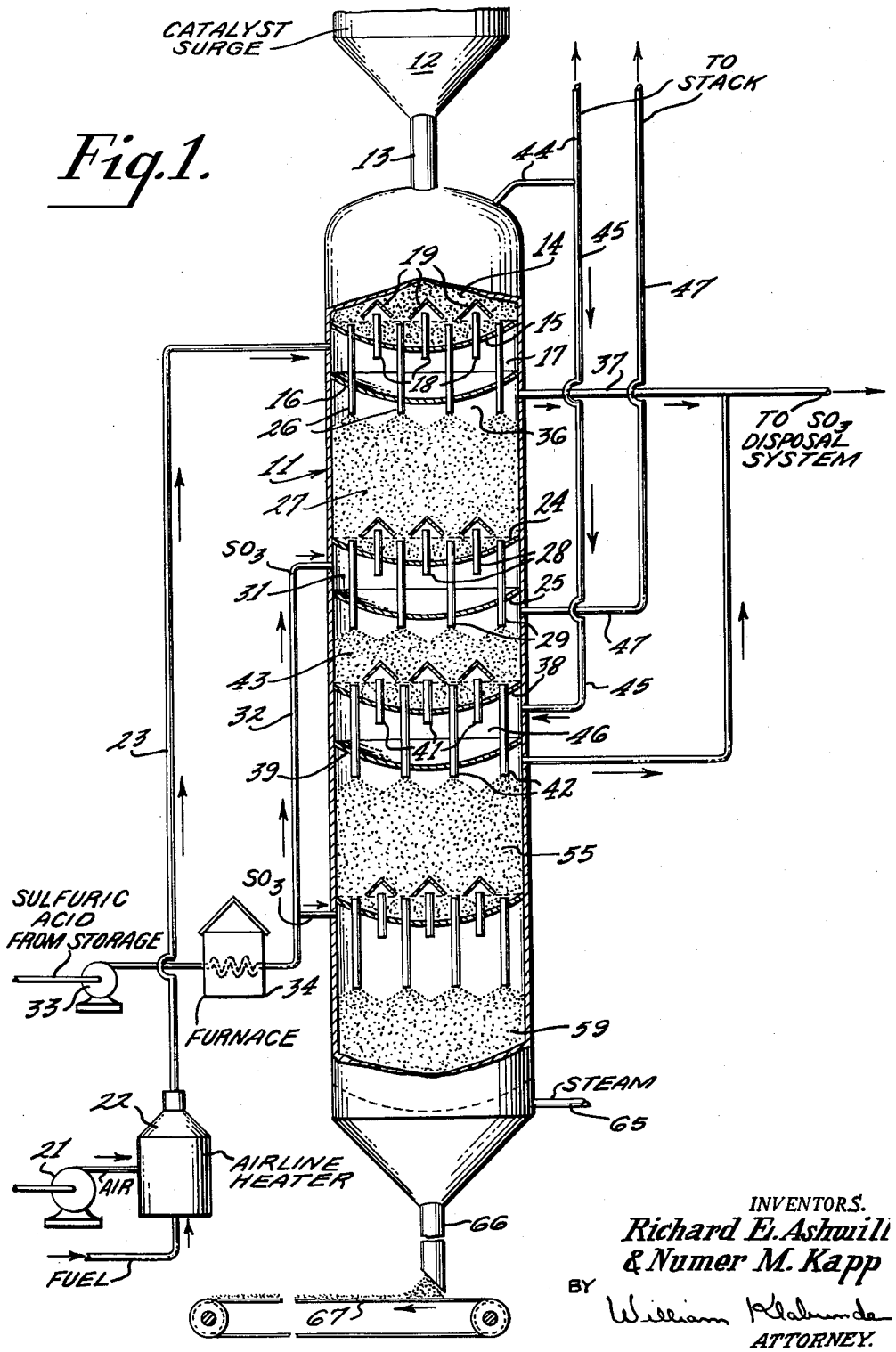
Fig. 1 is an elevation view, in partial section, showing a system for effecting the sulfation of kaolin clay.

Fig. 1 discloses a sulfating unit comprising a cylindrical vessel 11 which is continuously supplied with kaolin clay particles from a surge hopper 12 supported above the vessel 11 and connected thereto by a solids transfer conduit 13. The solids will hereinafter be referred to as catalyst inasmuch as the invention has as one of its most practical applications the sulfation-desulfation treatment of catalyst pellets or granules.

The catalyst descends through conduit 13 as a compact moving column and is deposited upon the surface of a compact moving bed of solids 14 supported by a tube-sheet 15 in the uppermost region of the vessel 11. A companion tube-sheet 16 extends across the vessel 11 a short distance below the tube-sheet 15 so as to provide a gas distributing plenum 17 therebetween.

Tube-sheet 15 is provided with a series of gas introduction nipples 18 which convey gas from the plenum 17 into the lower region of bed 14. The nipples 18 are capped by conventional means, such as conical members 19, to keep the nipples free of catalyst. Heated air supplied through pump 21 to air line heater 22 is conveyed through conduit 23 into the plenum 17, from which it passes upwardly through the nipples 18 into the bed 14. Bed 14 therefore constitutes a preheating zone wherein the catalyst may be raised to a relatively high temperature before its introduction into the sulfating zone.

A pair of tube-sheets 24 and 25, similar to tube-sheets 15 and 16, extends across the vessel 11 a substantial distance below the first-mentioned pair of tube-sheets. Catalyst is withdrawn from the bottom of bed 14 through a plurality of elongated nipples 26 which pass entirely through plenum 17 and extend a distance within the relatively large chamber provided between tube-sheets 16 and 24. The catalyst discharging from nipples 26 into such chamber is deposited directly upon the surface of a compact moving bed of catalyst 27, which bed comprises the initial sulfating zone.

Nipples 28 and 29, corresponding to nipples 18 and 26, are provided in the pair of tube-sheets 24 and 25. The space 31 between the tube-sheets 24 and 25 provides a vapor introduction plenum into which the gaseous sulfating medium, such as vaporous sulfur trioxide and steam, is introduced through conduit 32. The sulfur trioxide may be supplied from storage as a liquid and conveyed by means of pump 33 to a heater 34 wherein the liquid sulfur trioxide is vaporized. Steam, supplied from conduit 35, also may be passed through furnace 34 and the heated streams combined within the conduit or transfer line 32. Or, the sulfating medium may be obtained by heating liquid sulfuric acid.

The gaseous sulfating medium introduced into plenum 31 is conveyed upwardly through capped nipples 28 into the bottom region of bed 27. The sulfating gas passes upwardly through bed 27 into the catalyst-free space 36 between surface of the bed and the bottom of tube-sheet 16. The gaseous effluent is discharged from space 36 through conduit 37 which conveys it to a disposal system, not shown.

Another pair of tube-sheets 38 and 39 is provided at a still lower level within the vessel 11 and has associated therewith nipples 41 and 42 similar to nipples 28 and 29. The space between tube-sheets 25 and 38 provides a cooling chamber wherein catalyst withdrawn from the first sulfation zone 27 is maintained as a compact moving bed 43 and is cooled to remove part or all of the exothermic heat of sulfation. The space between tube-sheets 38 and 39 provides a gas distributing plenum into which gas may be introduced for subsequent conveyance into the bed 43 through nipples 41.

In the cooling chamber the catalyst may be cooled either by indirect heat exchange with a coolant, such as water, passed through a coil submerged within the compact moving bed of catalyst 43, or the catalyst may be cooled by contact with inert gaseous material which is at a lower temperature than the catalyst and is passed through bed 43 so as to cool the catalyst by direct heat exchange.

In the embodiment of the invention illustrated in Fig. 1, a portion of the flue gas which is discharged from the upper end of the preheating chamber through discharge conduit 44 for conveyance to the stack is bypassed through conduit 45 and is introduced into the gas-distributing plenum 46 formed between the tube-sheets 38 and 39. The flue gas, which is relatively cool by reason of its having been used to preheat the catalyst in bed 14, flows upwardly from plenum 46 through gas-conducting nipples 41 into and upwardly through bed 43. The coolant gas is collected in the catalyst-free space between the surface of bed 43 and the bottom of tube-sheet 25 and is discharged from such space through conduit 47 which conveys the waste gas to the stack.

Figure 2:
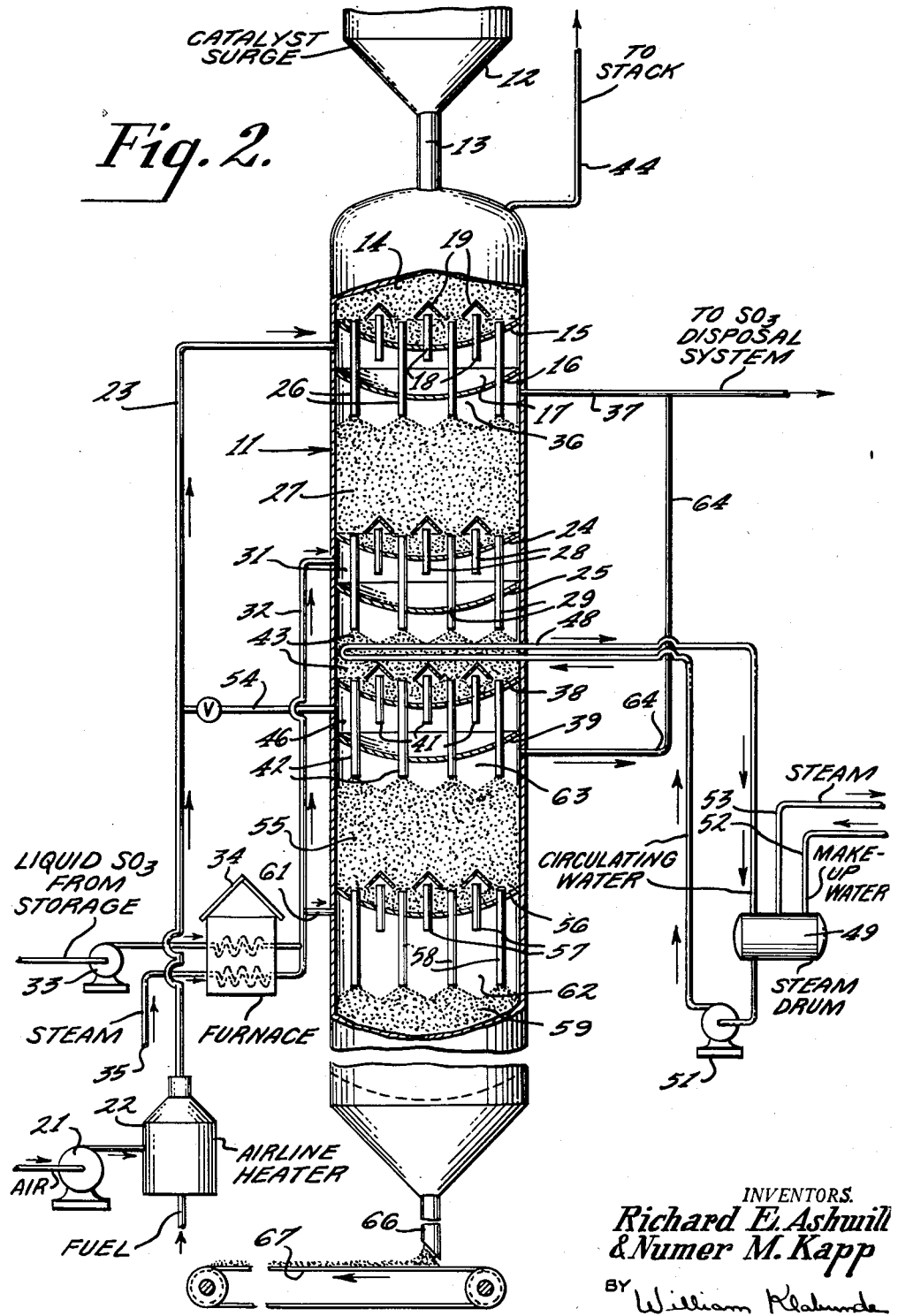
Fig. 2 is a modification of Fig. 1 showing a modification of the cooling system.

In the embodiment of the invention illustrated in Fig. 2, a cooling coil 48 extends within the bed 43 and is connected to a water-circulating cooling system comprising a steam drum 49, a pump 51 and separate conduits 52 and 53 for supplying makeup water to the drum 49 and for removing steam therefrom, respectively. In this type of cooling system it is necessary that the vaporous $SO_3$ be prevented from entering the cooling zone where it will not only condense on the cooling coil and cause serious damage thereto but will also cause the pellets to stick. In order to eliminate such hazard, a portion of the flue gas being conveyed from heater 22 through conduit 23 is bypassed from the latter conduit through conduit 54 and is introduced into the plenum 46, from which it is conveyed upwardly into bed 43 through nipples 41. The flue gas from conduit 54 is introduced in such controlled amount as to maintain a positive flow of flue gas from the bed 43 upwardly through long catalyst discharge nipples 29 into the bed 27 comprising the initial sulfation zone, and downwardly through long catalyst discharge nipples 42 into the compact moving bed 55 which constitutes the secondary sulfation zone. Since the flow of gas through bed 43 is sufficient only for sealing purposes, the additional heat introduced by the hot flue gas into the bed 43 can readily be removed by the cooling coil 48.

Catalyst bed 55 is supported upon a tube-sheet 56 which forms the lowermost boundary of the secondary sulfating zone. Tube-sheet 56 is similarly provided with short gas-conducting nipples 57 and long catalyst-conducting nipples 58. Nipples 58 convey catalyst from the bottom of bed 55 and deposit the same directly onto the surface of a compact moving bed 59 supported in the region of vessel 11 beneath the secondary sulfation zone.

A portion of the sulfating gas is bypassed from conduit 32 through conduit 61 and is introduced into the catalyst-free space 62 formed between the surface of bed 59 and the bottom of tube-sheet 56. The sulfating gas is passed upwardly from plenum 62 through short nipples 57 into and upwardly through bed 55 comprising the secondary sulfation zone. The gaseous effluent of the secondary sulfation zone is collected in the catalyst-free space 63 formed between the surface of bed 55 and the bottom of tube-sheet 39, and is discharged from the collecting zone 63 through conduit 64. The gaseous effluent flowing in conduit 64 is combined with the gaseous effluent in conduit 37 and the total effluent is conveyed to a disposal system, not shown.

Catalyst is withdrawn from bed 59 through a catalyst draw-off system of known design located at the bottom of the vessel 11. Seal gas is introduced, as through conduit 65, beneath the bed 59 so as to maintain an upward flow of gas through the bed sufficient to prevent the vaporous sulfur trioxide from accompanying the catalyst through the draw-off system. From the bottom of the vessel 11 the catalyst is discharged as a single compact moving stream through outlet conduit 66 and is conveyed by any suitable means, such as by an endless belt conveyor 67, away from the unit. Following its removal from the sulfation unit illustrated in Fig. 1 the sulfated catalyst may be passed to a separate desulfation unit wherein the catalyst is contacted with a suitable reducing agent to decompose the sulfates formed during the sulfation reaction, after which the reduced catalyst is treated for removal of the desulfation products, as will hereinafter be described.

As an alternative procedure, however, the desulfation treatment may be effected in a vessel which is located directly beneath the vessel 11. Or, the desulfation unit may be incorporated in the vessel 11, which would then be extended downwardly so as to contain the desulfation zone and a purge zone in its lower portion. Thus, the vessel 11 of Fig. 2 may be considered as being elongated sufficiently to contain the desulfation section, which is removed because of insufficient room for illustration. The desulfation unit which would fit between the separate segments of the unit 11 of Fig. 2 is illustrated in Fig. 3.

Figure 3:
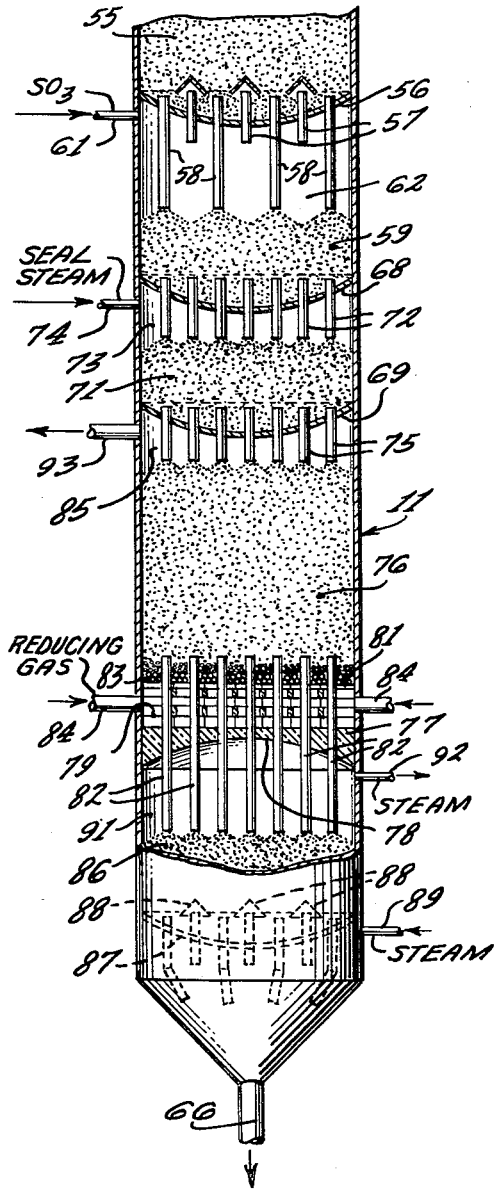
Fig. 3 is an elevation view, in partial section, showing a system for successively desulfating sulfated kaolin clay and heat treating the same with steam.
Figure 4:
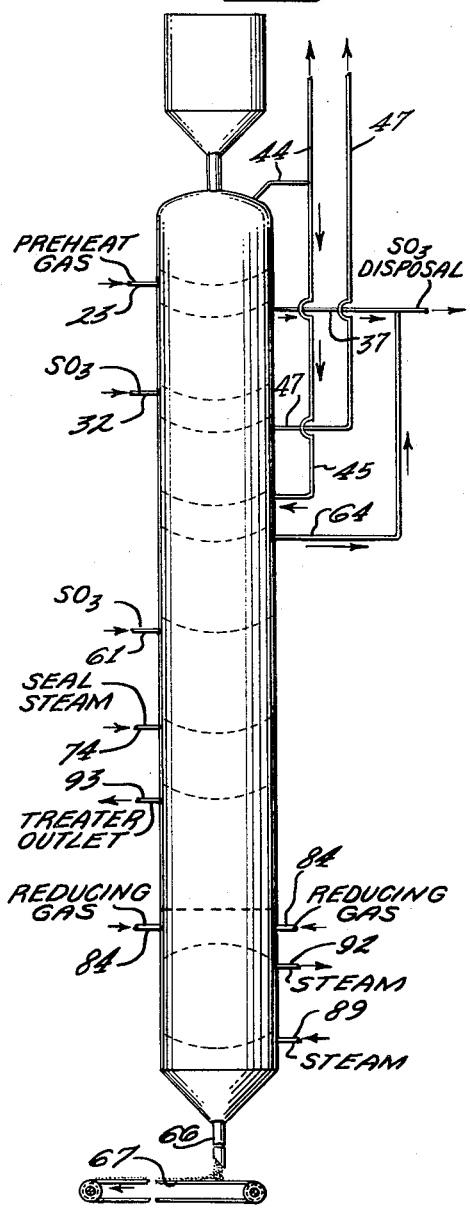
Fig. 4 shows a unitary structure embodying superimposed zones for sulfating and desulfating, and for heat treating with steam to obtain selectivity adjustment.

Fig. 3 shows the construction of the combined sulfation-desulfation unit as it appears below the lowermost sulfating zone 55 and the bed 59 which receives the sulfated catalyst. The catalyst bed 59 is supported on the uppermost of a pair of tube-sheets 68 and 69 which is spaced to provide a chamber adapted to contain a relatively shallow bed of catalyst 71. Tube-sheets 68 and 69 are provided with catalyst discharge nipples 72 and 75, respectively. The space 73 between the surface of bed 71 and the bottom of tube-sheet 68 provides a plenum into which a seal gas, such as steam, is introduced through inlet 74. The steam flows upwardly through nipples 72 and bed 59, and downwardly through bed 71 and nipples 75, thereby maintaining a positive flow of gas in both directions sufficient to prevent undesirable migration of gases between the sulfating and the desulfating sections of the unit. From bed 71 the sulfated catalyst is discharged through nipples 75 directly onto the surface of a relatively deep compact moving bed 76 comprising the desulfating or reducing zone.

Bed 76 is supported upon a refractory structure, generally indicated by the numeral 77, which extends across the cylindrical vessel 1. Structure 77 comprises an imperforate refractory dome 78 upon which there is placed a relatively deep layer of refractory brick 79 arranged in checkered design so as to provide continuous passageways for the flow of gas across and upwardly through the brickwork structure. The layer of brick 79 is covered with a layer of perforate refractory tile 81.

A plurality of ceramic pipes 82 are set vertically in the refractory structure 77 with their ends extending above and below the structure to provide catalyst discharge conduits at the bottom of bed 76.

A double layer of inert alumina balls 83 cover the surface of the tiles 81 to a depth slightly below the inlet level of the ceramic pipes 82. The largest balls are in the bottom layer and are of a size greater than the size of the perforations in the tiles. The relationship between the size of the largest balls and the lateral spacing between the tile perforations is such that only a relatively small number of the tile perforations may have their upper ends blocked off by the balls. Catalyst bed 76 actually rests upon the layer of alumina balls 83, and the spacing between the balls is such as to prevent the descent of catalyst through the layer of balls and into the tile perforations.

Reducing gas is introduced into the region of vessel 11 occupied by the brickwork layer 79 through inlet nozzles 84, which may be arranged at 90° angular spacing around the circumference of the vessel 11. The reducing gas flows upwardly through the open brickwork and tile structure and through the layer of inert alumina balls into bed 76 where it reduces the sulfates formed in the catalyst within the sulfation zones. The gaseous effluent of the desulfation zone 76 is collected in the space 85 provided between the surface of bed 76 and the bottom of tube-sheet 69 and is discharged from the unit through outlet 93.

The catalyst is discharged from the bottom of bed 76 through ceramic pipes 82 and is discharged directly onto the surface of a compact moving bed of catalyst 86 supported on tube-sheet 87 which contains a plurality of gas-conducting nipples 88. In the space beneath tube-sheet 87, relatively low temperature steam is introduced through inlet 89. The steam passes upwardly through gas-conducting nipples 88 into and through bed 86, which is cooled by the steam. The steam is collected in a plenum 91 formed between the surface of bed 86 and the underside of the brickwork dome 77, and is discharged from the plenum through outlet 92. The heated steam may, if desired, be reintroduced to the system through inlet 84. The catalyst is discharged from bed 83 through a catalyst draw-off system of known design which combines the catalyst into the single stream in discharge conduit 66.

Vapor-phase sulfation and desulfation of kaolin clays in the preparation of granular catalyst are disclosed in copending joint applications of Joseph J. Donovan and Thomas H. Milliken, Jr., Serial Nos. 508,798 and 513,-608, filed May 16, 1955, and June 6, 1955, respectively, the latter now U.S. Patent No. 2,848,422. These copending applications, however, relate to fixed-bed operation wherein the catalyst to be treated is maintained as a fixed compact mass or bed within a reaction zone, while the gaseous material is caused to flow through the compact bed. The nature of the treatment and of the materials treated are well set forth in the aforementioned copending application, so that further discussion herein is not considered necessary for a complete understanding of the present invention.

The present invention is directed primarily to the application of the compact moving bed technique to vapor-phase sulfation and/or desulfation of kaolin clay catalyst pellets. Certain advantages for vapor-phase sulfation over the aforementioned liquid-phase treatment having been established, attention was directed to the development of an improved method and means for effecting contact between the granular clay material and the gaseous treating medium and for achieving a continuous operation whereby either or both the sulfation and desulfation treatments could be effected with a minimum requirement of time and handling of the clay particles.

In connection with such development a series of laboratory pilot plant experiments was conducted to determine the advantages in carrying out such vapor-phase treatment of kaolin clay pellets while the latter gravitated as a compact moving bed through the treating zone. In other words, the well-known moving bed technique was applied to vapor-phase treatment of the clay. For comparison purposes, the catalyst pellets were treated under similar conditions while being maintained as a fixed compact bed. The practicality of moving bed technique in vapor-phase treatment of kaolin clay was clearly established by these experiments.

Following such experiments in connection with sulfation treatment, further experiments were conducted for the purpose of applying the same technique to the desulfation treatment of kaolin clays. For such purpose a series of experiments was conducted under both fixed-bed and moving-bed conditions, with the result that the moving-bed technique was established as being desirable for the desulfation treatment.

Since both sulfation and desulfation have been satisfactorily accomplished under moving-bed conditions in separate treating steps the two treatments were combined into a single treating process in which the clay particles are conveyed as a continuous compact moving mass through a single downflow path including a plurality of separate zones for effecting in sequence the sulfation and desulfation treatments, with suitable sealing means being provided to prevent undesirable migration of gaseous material into zones of the system where the presence of such gaseous material would be undesirable. In carrying out the desulfation treatment various reducing agents such as hydrogen sulfide, sulfur, hydrogen, carbon monoxide, ammonia and methane were tried. It was found that the effectiveness of the agents in promoting the desulfation reaction was in the order named. It was also determined that the best results, from a product distribution and activity standpoint, were obtained on catalysts which were desulfated in a hydrogen-steam atmosphere or desulfated and then steam treated in the temperature range of about 450–1600° F.

To demonstrate the practicability of the moving-bed technique as applied to a sulfation-desulfation treatment of kaolin clays, the aforementioned series of experiments was conducted in a moving-bed semi-commercial pilot plant unit having a design capacity of 1 ton/day.

The experimental unit comprised a vertical cylindrical vessel having an overhead catalyst feed hopper. The vessel was internally partitioned in its upper portion to provide an upper catalyst preheating zone and a lower sulfation zone. At the bottom of the vessel an elongated draw-off conduit was provided so as to discharge the sulfated catalyst as a compact moving column adapted to provide a seal leg.

Provision was made for introducing a preheated air stream into the bottom of the preheating zone, and also for discharging the gaseous heating medium from the top of the vessel to a stack. A portion of the preheated air was diverted to the compact moving column forming the seal leg in order to prevent the escape of gaseous material from the sulfation zone through the draw-off conduit. Sulfur trioxide and steam were introduced at the bottom of the sulfating zone and the gaseous sulfation products were discharged from the upper end thereof.

A series of sulfation runs in accordance with the present invention were made in the pilot unit, typical of which is the experiment forming the basis for the following example:

Example I

The raw clay treated in this example was a kaolin clay from Putnam County, Florida, known as Edgar Plastic kaolin, which gave the following analysis (wt. percent), as received:

| | Percent |
|---|---|
| Ignition loss | 15 |
| $SiO_2$ | 47 |
| $Al_2O_3$ | 37 |
| $Fe_2O_3$ | 0.8 |
| $Na_2O$ | 0.2 |
| $TiO_2$ | 0.2 |
| $MgO$ | 0.2 |
| $CaO$ | 0.2 |

The clay was received as a powder and was slurried with water in the ratio of 100 lbs. of clay to 233 lbs. of water, after which the pH was adjusted to 8–9 with ammonia water. 106 lbs. of slurry were then mulled with 100 lbs. of dry clay for 25 minutes in a Lancaster mixer. The mixture was then extruded through a double die-plate extruder having a final die opening of 4.75 mm., thus forming 3/16" pellets. The pellets were dried at 240° F. on a belt dryer.

The clay pellets then were sulfated by being contacted in a moving-bed reactor wherein the catalyst gravitated in the form of a bed having a depth of 37 inches. The catalyst residence time in the reaction zone was 16.1 hrs. and the temperature range was 720–920° F. The treating gas comprised 43 mole percent sulfur trioxide, 52 mole percent steam and 5 mole percent air.

The resultant sulfated clay catalyst had a bulk density of 1.26–1.29 kilograms per liter and a sulfur trioxide content (ignition basis) of 32.9 percent. It also showed an ignition loss (as received) of 30.2 percent and contained 9.7 percent of water (ignition basis).

Subsequent treatment and tests of the sulfated catalyst obtained from the aforementioned sulfation experiments under vapor-phase, moving-bed conditions revealed that catalyst treated in accordance with the invention displayed significantly increased activity and pellet hardness; however, with accompanying small loss in selectivity.

Following the experimental sulfation work, a series of desulfation experiments was conducted under differential conditions for the purpose of demonstrating the feasibility of moving-bed desulfation for commercial operation. For the purpose of simulating actual conditions which would be encountered in a commercial type moving-bed unit, a reduction treater was constructed. The treater comprised a vertical cylindrical vessel having a catalyst inlet at the top for charging the sulfated catalyst to the treater and a catalyst discharge at the bottom for removing the product catalyst. A suitable reducing gas was obtained by controlled combustion of propane in an inert gas generator of known design. The inert gas was then combined with steam and introduced into the bottom of the desulfation vessel. The reducing gas was passed upwardly through the gravitating bed of catalyst and discharged at the top of the treater to a stack.

Data obtained in a typical desulfation run is given in the following example:

Example II

The wet sulfated kaolin clay charge catalyst comprised 4.5 mm. pellets which gave the following analysis (wt. percent):

| | Percent |
|---|---|
| Ignition loss (as received) | 52.0 |
| $SO_4$ (as received) | 37.7 |
| $SO_3$ (ignited basis) | 62.9 |
| Free carbon (as received) | 0.2 |
| Ignition loss (ignited basis) | 108.3 |

Although it has been stated that reduction may be carried out in the presence of reducing gas, such as a hydrogen, nitrogen, steam mixture, the experiments were carried out with reducing flue gas and steam. The operating conditions for the experimental run considered as typical are as follows:

| | |
|---|---|
| Temperature, °F. (approx.) | 1555 |
| Catalyst residence time, hrs. | 8 |
| Gas rate, #/# catalyst | 3.8 |
| Feed gas composition, mole percent— | |
| $CO_2$ | 1.6 |
| $O_2$ | 0 |
| $CO$ | 3.0 |
| $H_2$ | 1.8 |
| $H_2O$ | 72.8 |
| $N_2$ | 20.8 |
| $CO+H_2$ rate, mol percent of stoichiometric for sulfate reduction | 109 |

As a result of the reduction or desulfation experiments the completely desulfated catalysts (containing up to 0.6 wt. percent $SO_3$) were found to have properties in the following ranges:

| | |
|---|---|
| Bulk density, kg./l | 0.75–0.80 |
| Surface area, $M.^2/gm$ | 78–109 |
| Ball mill hardness | 86–90 |
| Knife edge hardness | 10,600–12,800 |
| Air jet | 38–54 |

Fixed-bed evaluation of the desulfated catalyst in a catalytic cracking process carried out in a 6 liter pilot plant unit charging a 56–77% cut of East Texas crude oil at 900° F. produced the following data:

| | |
|---|---|
| Coke yield, wt. percent (at 50 vol. percent conversion) | 3.0–3.5 |
| Space rate, v./hr./v. (at 55 vol. percent conversion) | 1.8–2.7 |

The foregoing properties were determined on the basis of a series of pilot plant experiments in which the operating conditions were in the following ranges:

| | |
|---|---|
| Catalyst residence time, hrs | 8–16 |
| Temperature, °F | 1500–1570 |
| Total gas rate, lb./lb. product catalyst | 3.7–7.3 |
| $CO+H_2$ rate, percent of stoichiometric | 100–210 |
| Steam concentration, mol percent desulfating gas | 50–75 |

The process of the present invention, whether the sulfation and desulfation treatments be carried out separately or be combined in a single unitary structure, has the obvious advantage of providing continuity of operation. Such operation makes for better process and heat control. By reason of the vapor-phase treatment, the sulfation of the kaolin can be carried out after the kaolin has been preformed, as by extrusion, into granules or pellets of the desired shape and size. With respect to the desulfation treatment, the moving-bed operation offers advantages not to be found in the rotary kiln treatment heretofore employed.

Some of the advantages of moving bed desulfation, as compared to prior known practice of employing a rotary kiln, are (1) permits use of quite low gas/catalyst ratio; (2) permits feasible recovery of $SO_2$ because of high $SO_2$ concentration in off-gas stream from desulfating unit; (3) where liquid-phase sulfation followed by oil denning is employed preliminary to to the vapor-phase desulfation treatment, the oil carried over from the denning operation is readily recoverable from off-gas stream.

It is to be understood that the invention is not limited to any particular source for supplying vaporous $SO_3$ in the vapor-phase sulfation treatment. Thus, Fig. 1 shows the $SO_3$ as being obtained by the heating of sulfuric acid, whereas Fig. 2 shows the $SO_3$ as being obtained by heating liquid SO₃ and combining the SO₃ vapor with steam.

Obviously modifications and variations of the invention as herein set forth may be made without departing from the spirit and scope thereof, and it is desired therefore that only such limitations should be imposed thereon as are indicated in the appended claims.

What is claimed is:

1. The method for treating granular kaolin clay to condition the same for use as a contact medium for chemical processing which comprises the steps of: introducing the granular material as a compact moving stream into a preheating zone wherein said stream is expanded to form a compact moving bed; contacting said granular material in said preheating zone with hot inert gaseous material so as to heat said granular material to a temperature of approximately 700° F.; passing said granular material as a compact moving stream from the bottom of said preheating zone into a first reaction zone wherein said stream is expanded to form a second compact moving bed; contacting said granular material with vaporous sulfur trioxide within said first reaction zone, said sulfating material being introduced in controlled amount so as to prevent an excessive temperature rise due to the exothermic sulfation reaction; passing said granular material as a compact moving stream from the bottom of said first reaction zone into a heat-exchange zone wherein said stream is expanded to form a third compact moving bed; effecting an exchange of heat between said granular material and a fluid heat-exchange medium within said heat-exchange zone to adjust the temperature of said granular material to approximately 700° F.; passing said granular material as a compact moving stream from the bottom of said heat-exchange zone into a second reaction zone wherein said stream is expanded to form a fourth compact moving bed; contacting said granular material with said vaporous sulfur trioxide within said second reaction zone to continue to substantial completion the reaction initiated in said first reaction zone; and discharging the treated granular material as a compact moving stream from the bottom of said second reaction zone.

2. The method as in claim 1 in which a removal of heat is effected from within said heat exchange zone by indirect heat exchange between said granular material and a circulating confined stream of liquid coolant.

3. The method as in claim 1 in which a removal of heat is effected from within said heat-exchange zone by direct heat exchange between said granular material and gaseous material comprising effluent gas obtained from said preheating zone.

4. The method as in claim 1 in which said heat-exchange medium is introduced into said heat-exchange zone at a temperature substantially lower than the temperature of the granular material introduced therein to thereby remove from said granular material heat acquired within said first reaction zone as a result of the exothermic sulfation of components of said kaolin clay.

5. The method as in claim 1 including the steps of: passing said compact stream of granular material discharged from said second reaction zone into a third reaction zone wherein said stream is expanded to form a fifth compact moving bed; contacting said granular material with reducing gas in said third reaction zone to effect a desulfation of said granular material; passing said granular material as a compact moving stream from the bottom of said third reaction zone into a cooling zone wherein said stream is expanded to form a sixth compact moving bed; contacting said granular material in said cooling zone with relatively low temperature steam to cool the granular material withdrawn from said third reaction zone; and discharging said granular material as a compact moving column from the bottom of said cooling zone.

6. A method as in claim 5 in which said reducing gas comprises hydrogen, and wherein said third reaction zone is at a temperature in excess of 1000° F.; whereby said granular material is sulfated within said first and second reaction zones, and the resultant sulfated granular material is desulfated and selectivity adjusted within said third reaction zone, said reduction being accomplished in a catalyst residence time of 8–16 hrs., at a temperature in the range of 1500–1570° F., and at a gas/catalyst weight ratio of 3.7–7.3, and at a steam concentration of 50–75 mol percent of desulfating gas.

7. A method as in claim 6 including the step of passing the high temperature steam removed from said cooling zone into said reduction zone to provide at least part of the steam requirement therein.

8. The method for treating kaolin clays to improve catalytic activity and render the clays more suitable as catalytic material in the conversion of hydrocarbons which comprises the steps of: gravitating granular particles of said clay as a continuous compact moving mass sequentially through: a preheating zone wherein the temperature of said mass is raised to approximately 700° F.; a first sulfation zone wherein the particles are contacted with vaporous sulfur trioxide introduced in controlled amount so as to prevent an excessive temperature rise due to the exothermic sulfation reaction; a cooling zone wherein exothermic heat of sulfation is removed from said particles so as to restore the temperature of said mass to approximately 700° F.; a second sulfation zone wherein the desired sulfation treatment is completed; a desulfation zone wherein said particles are contacted with reducing gas to effect the desulfation of the sulfates formed within said sulfation zones; and a cooling zone wherein the particles are contacted with steam; the path of flow for said compact moving mass between said second sulfation zone and said desulfation zone being sealed to prevent the migration of said gases between said zones.

9. The method of desulfating previously sulfated kaolin clay particles which comprises the steps of introducing said particles into a treating zone adapted to contain the same in the form of a compact moving bed, introducing a reducing gas having a total reducing agent content of 100–210 mol percent of stoichiometric for sulfate reduction into the bottom of said treating zone for countercurrent flow upwardly through said bed to thereby reduce the sulfates contained in said particles, said reduction being accomplished in a catalyst residence time of 8–16 hrs., at a temperature in the range of 1500–1570° F., and at a gas/catalyst weight ratio of 3.7–7.3, and at a steam concentration of 50–75 mol percent of desulfating gas; discharging the gaseous effluent from said reduction treatment at the upper end of said treating zone, passing said particles from the bottom of said bed as a plurality of confined compact moving streams into a cooling zone located beneath said treating zone, said cooling zone being adapted to contain said particles as a second compact moving bed, introducing steam into the bottom of said cooling zone for countercurrent flow upwardly through said second bed, removing said steam from the upper end of said cooling zone, discharging said particles from the bottom of said second bed as a plurality of compact moving streams, and combining said last-mentioned streams into a single compact moving discharge stream of desulfated clay particles.

References Cited in the file of this patent

UNITED STATES PATENTS

| | | |
|---|---|---|
| 1,796,799 | Manley et al. | Mar. 17, 1931 |
| 2,322,674 | Thomas | June 22, 1943 |
| 2,464,127 | Gary | Mar. 8, 1949 |
| 2,484,828 | Hickey | Oct. 18, 1949 |
| 2,509,014 | Payne et al. | May 23, 1950 |
| 2,526,701 | Shirk | Oct. 24, 1950 |
| 2,596,609 | Shabaker | May 13, 1952 |
| 2,750,258 | Jukkola et al. | June 12, 1956 |